(No Model.) 2 Sheets—Sheet 2.

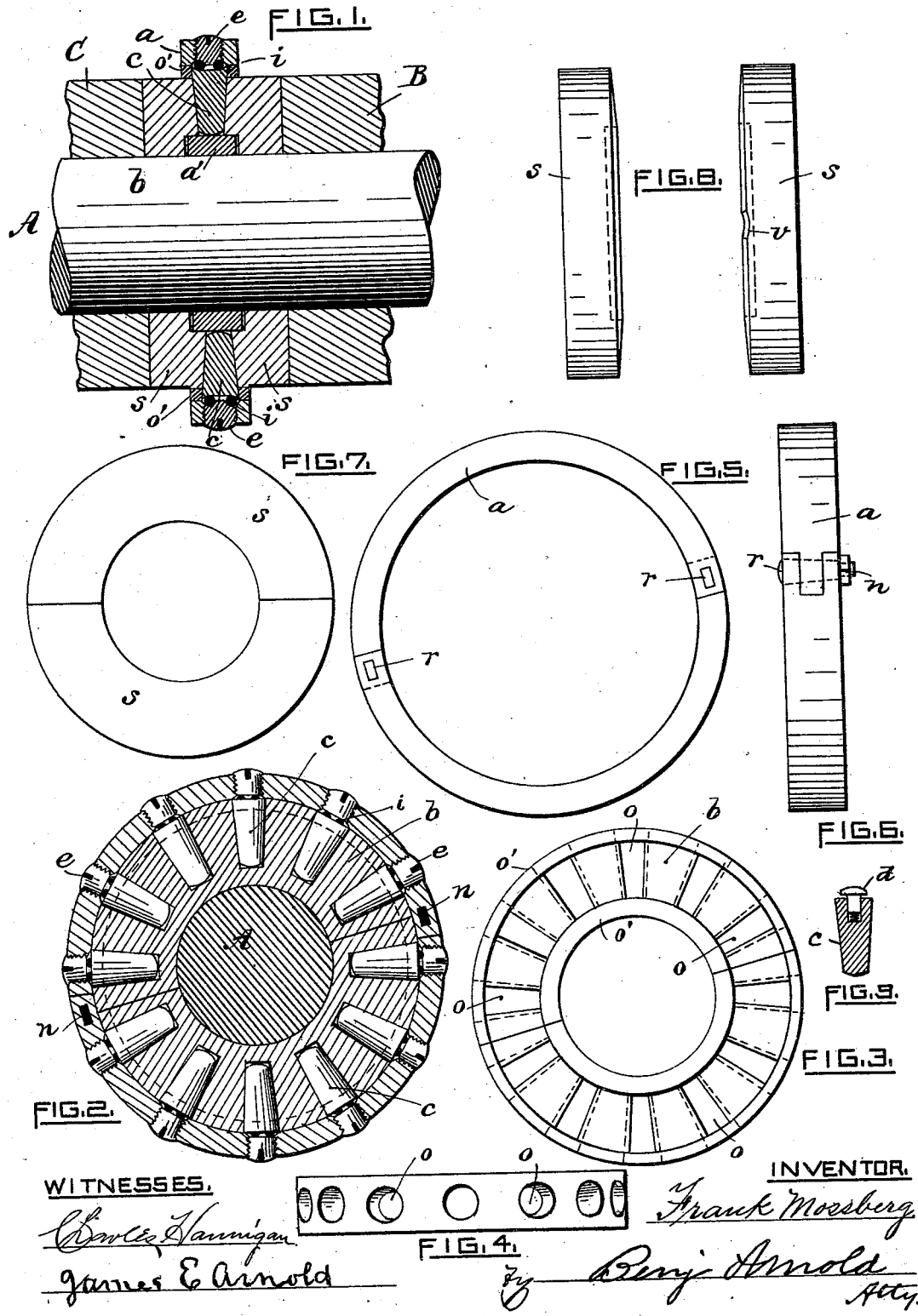

F. MOSSBERG.
ROLLER BEARING.

No. 555,655. Patented Mar. 3, 1896.

WITNESSES.
Charles T. Hannigan.
James E. Arnold

INVENTOR.
Frank Mossberg.
by Benj. Arnold
Atty.

UNITED STATES PATENT OFFICE.

FRANK MOSSBERG, OF ATTLEBOROUGH, MASSACHUSETTS.

ROLLER-BEARING.

SPECIFICATION forming part of Letters Patent No. 555,655, dated March 3, 1896.

Application filed July 16, 1895. Serial No. 556,181. (No model.)

*To all whom it may concern:*

Be it known that I, FRANK MOSSBERG, of Attleborough, in the county of Bristol and State of Massachusetts, have invented certain new and useful Improvements in Roller-Bearings; and I do hereby declare that the following is a full, clear, and exact description thereof, reference being had to the accompanying drawings, and to the letters of reference marked thereon, which form a part of this specification.

This invention relates to that class of anti-friction-bearings called "roller-bearings," and particularly to those used as thrust-bearings to remove the friction where there is great pressure endwise of a shaft, as in the case of propeller-shafts and the like.

It is fully explained and illustrated in this specification and the accompanying drawings.

Figure 10:
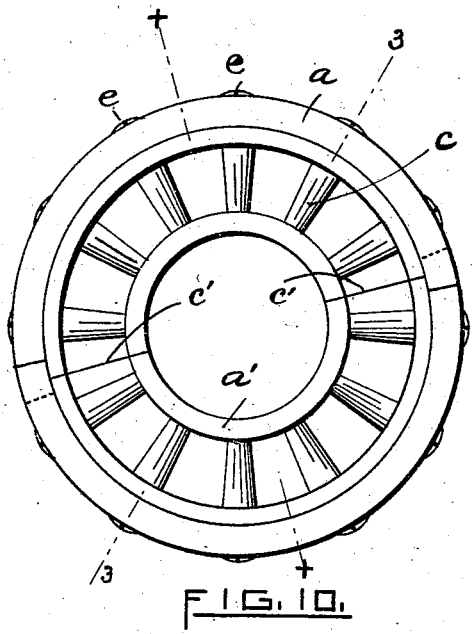
Figure 11:
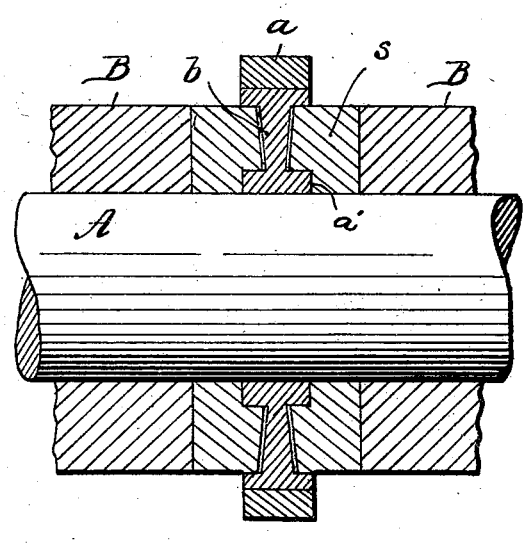
Figure 12:
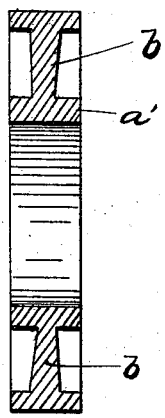
Figure 13:
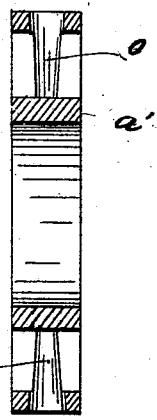

Figure 1 shows a section of the roller-bearing taken lengthwise of the shaft through its center, with the shaft and rolls in elevation. Fig. 2 is a section through the middle transversely to the line of the shaft, with the rolls in elevation. Fig. 3 shows a side view of the cage that holds the rolls. Fig. 4 is an edge view of the cage shown in Fig. 3. Fig. 5 shows a side view of the ring that holds the rolls in the cage. Fig. 6 is an edge view of the ring seen in Fig. 5. Fig. 7 is a face view of one of the steel washers that the rolls run on. Fig. 8 shows an edge view of the two steel washers in working position. Fig. 9 shows a modification of the outer end of the rolls. Fig. 10 is a side elevation of the cage, ring, and rolls complete. Fig. 11 is a section taken longitudinally through the center of the shaft and cage on line $xx$, Fig. 10. Fig. 12 is a section on the same line as Fig. 11 of the cage only. Fig. 13 is a section of the cage on line 3, Fig. 10.

The following is the construction of the bearing. A is a portion of the shaft of a propeller. B is a part of the box or bearing it turns in. C is a collar made fast on the shaft A. Two hardened-steel washers $ss$, made in halves, are placed on the shaft, one against the box B and the other against the collar C, to take the wear off the rolls $c$. The faces of these washers that are toward each other are made on an incline to agree with the taper of the rolls $cc$, the lines of two opposite sides of which would meet in the center of the shaft A. The cage $b$ is made in two halves for convenience in putting it on the shaft. The two halves when placed together in the same plane form a ring in which tapering holes $oo$ are bored with a tool large enough to cut through the metal on both sides of the cage, except at the flange $o'$, and form bars between the holes with concave sides to hold the rolls $cc$. The holes $oo$ are not bored clear through to the hole in the middle of the cage $b$, but stop short, so as to leave some metal at the bottom of the holes to hold the bars of the cage together, and a flange $o'$ is made on both sides around the center opening and at the outer edge of the cage. A ring $a$, having its central opening of the same diameter as the outside of the cage $b$, is made in two parts that are tenoned together on opposite sides, and a taper-key $r$ is put through the two parts of the joint, with a screw-nut $n$ on its smaller end to draw the key in and bring the parts of the ring together. (See Figs. 5 and 6.) The rolls $c$ are made tapering, as described above, so that their apices are at the center of the shaft A when in working position, to insure a perfect rolling friction between them and the steel washers $ss$ throughout the whole length of the rolls. The taper of the rolls $c$ and the corresponding incline of the face of the washers $s$ cause a slight thrust outward of the rolls, and to relieve the outer ends of the rolls of friction in rubbing against the ring $a$, which friction would retard their turning freely, a set of balls $ii$ are placed in a recess in the outer end of each roll, and the screws $ee$ which are received on the ring $a$ have grooves made around their inner ends for the balls to run in.

As it is impossible to insure perfect accuracy of all the parts so that the rolls $c$ will always keep their best position, I make a concave recess $v$, Fig. 8, in the face of the washer $s$, next the box B, in which each roll in every revolution of the cage will be free to right itself, either by its own weight or assisted by a plug $d$ and spring $f$ in the outer ends of the rolls, (see Fig. 9,) which are arranged to push the rolls in slightly when free in case the balls $e$ are not used.

Having thus described my improvements, I claim as my invention and desire to secure by Letters Patent—

1. In a roller-bearing to receive the end-thrust of shafts, a cage to hold the rolls, consisting of a series of tapering radial bars having concave sides and a solid connection between said bars at their inner ends, tapering rolls fitted to turn between said bars and means for holding said rolls in place, substantially as described.

2. In a roller-bearing for end-thrust of shafts, a cage to hold the rolls, consisting of a series of tapering radial bars having concave sides and a solid connection between said bars at their inner ends, tapering rolls fitted to turn between said bars, a ring made in two parts fitted to clamp on the outer ends of said bars to keep the rolls in place, substantially as described.

3. In an end-thrust roller-bearing, a cage to hold the rolls constructed with tapering radial bars having concave sides and a solid connection between said bars at their inner ends, a series of tapering rolls fitted to turn between said bars, hardened washers having their inner faces beveled to agree with the taper of said rolls, and placed one on each side of the cage and rolls, substantially as described.

4. In an end-thrust roller-bearing, a cage to hold the rolls constructed with tapering radial bars having concave sides and a solid connection between said bars at their inner ends, tapering rolls fitted to turn between said bars, a ring made in two parts fitted to clamp on the outer ends of said bars, screws fitted radially in said ring and having their inner ends grooved or tapered, with balls placed between the ends of the rolls and the inner ends of the screws, substantially as described.

FRANK MOSSBERG.

Witnesses:
BENJ. ARNOLD,
S. L. LEETE.